UNITED STATES PATENT OFFICE.

OTTO S. MARCKWORTH, OF COLUMBUS, OHIO.

METHOD OF PRODUCING NONSHATTERABLE GLASS.

1,421,974.	Specification of Letters Patent.	Patented July 4, 1922.

No Drawing.	Application filed March 26, 1919. Serial No. 285,348.

*To all whom it may concern:*

Be it known that I, OTTO S. MARCKWORTH, a citizen of the United States, residing at Columbus, in the county of Franklin and State of Ohio, have invented a new and useful Method of Producing Nonshatterable Glass, of which the following is a specification.

This invention is a method by which so-called non-shatterable glass may be produced.

Heretofore attempts have been made to produce glass of the character referred to, by securing sheet celluloid between layers of glass, and it is well recognized that such an article would be of great practical value if it could be economically manufactured on a commercial scale for aviators' and motorists' goggles, windshields, signal lights, green-house glass, and the like.

The history of the art shows that many attempts have been made to produce non-shatterable glass by employing various transparent cements to unite the glass and celluloid laminæ, but this method of uniting the parts is impracticable from a commercial standpoint for several reasons, principally because all of the cements mentioned are subject to one or all of the following defects, viz:

(*a*) The laminæ when ready for assembling are more or less slippery and therefore handling of the product presents numerous almost insurmountable difficulties, resulting in the production of large proportions of imperfect product.

(*b*) Lack of sufficient bonding strength or adhesion to render the finished article valuable for its non-shatterable qualities.

(*c*) Lack of complete "fluid" transparency, thereby rendering the planes of surface contact more or less visible.

(*d*) Presence of the effect of milky strata or cloudiness between the laminæ.

(*e*) Excessive action upon the celluloid layer, which causes flabbiness, weakness and great liability to form bubbles upon the application of slightly elevated temperatures.

(*f*) Presence of solvents of so volatile a nature that permanency is either impossible or dependent altogether upon protection from volatilization and consequent disintegration by an impervious seal at the edges.

(*g*) Presence of solvents so active that the celluloid surfaces immediately swell and become very slippery and so render the articles weak and very difficult to handle successfully.

From the foregoing it will be readily understood that the cementing method is not only difficult from a practical standpoint, but it is costly and the finished article is prone to be more or less imperfect.

Another attempted method of producing non-shatterable glass is that of uniting the laminæ by first softening the celluloid with a solution of acetone or its equivalent, and then pressing the glass members into contact with the softened surfaces of the celluloid element, thereby avoiding the use of a cement. This method, however, is objectionable for the reason that the action of the softening medium (acetone, amyl acetate or their equivalents) which have been tried, is so rapid as to cause great swelling and softening of the celluloid, so that the articles formed have but little stability or strength. This method is also subject to all of the serious objections above discussed in connection with "cements," especially items *a*, *b*, *e*, *f*, and *g*. Owing to these conditions it is imperative that the parts be handled with infinite care, and production of really satisfactory articles by this method is rare. This method is also objectionable from a commercial standpoint because it is slow and uneconomical both in the details of operations and the elaborate machinery and equipment required.

One of the objects of the invention is to overcome the objectionable features incident to the methods above outlined, by employing a medium for softening the celluloid, which medium cannot be considered to be a solvent except under very specific conditions. A further object is to provide a solvent composition which contains an ingredient capable of retarding the softening effect of the active ingredient, so that the action of the latter may be controlled. A further object is to provide a solvent into which the article may be dipped and which will remain practically inactive as long as its temperature is substantially unchanged from a predetermined working point for the article in question. A further object is to overcome the necessity for coating the glass with a preliminary layer of gelatin or celluloid, thus obviating the expense, care and defects of such methods.

The invention will be hereinafter fully set forth and particularly pointed out in the claims.

In practicing the invention a solvent composition is employed, consisting of one of the higher alcohols combined with one or more ingredients. For instance, an active solvent such as propyl, butyl, or amyl alcohol or their mixtures, may be combined with one or more ingredients such as camphor plus most any of the essential oils, especially oil of citronella, oil of cloves, or methyl salicylate, said ingredients being capable of retarding the softening effect of the active solvent. Excellent results have been secured by a composition consisting of fusel oil $83\frac{1}{3}$ per centum and methyl salicylate and camphor $8\frac{1}{3}$ per centum each. These proportions vary with the character of the work to be performed in that the proportion of the fusel oil will either be reduced or increased and the combined proportion of the other ingredients correspondingly varied. It is preferred to use the essential oils and camphor in equal quantities under most conditions, but this is not always desirable. Whatever the changes in proportions may be, they are governed largely by the temperatures at which the solution is to be worked, and conditions encountered in the manipulation of the articles to be cemented, such as the temperature of the articles and atmospheric conditions generally. The varying conditions render adjustments necessary to suit those conditions.

The base, fusel oil (which for commercial reasons is most generally used in preference to the individual higher alcohols) is also mixed with other ingredients for special results. For example, if still greater bond is required than is obtained by the composition above described, certain of the coal tar preparations are used, especially aniline, xylol, toluol, and (or) naphthaline. Amines of various bodies and ammonia itself are also used for certain color effects. A small proportion of an amine for example, also increases the permanency of resistance of the laminæ to disintegrating atmospheric effects. Any of these substances may be used with or without camphor and essential oils in making up the working condition.

In practice, the glass and celluloid to be united are immersed in the solution above described, the solution being maintained at a temperature best adapted to working conditions. The temperature will vary to conform to atmospheric conditions, but the temperatures which have been found most satisfactory for operating on a commercial scale are between 24 degrees and 35 degrees centigrade. The article, consisting of assembled laminæ of glass and celluloid, after being removed from the solution is subjected to elevated temperatures for a very short period (a few seconds), after which pressure is applied to the extent required for expressing excess of solution and eliminating all air bubbles, and to cause complete and close contact and adhesion of the surfaces to be bonded together, the heat being increased during the period of pressure. There is practically no action of the solution when the article is first dipped, and the increased temperature before pressure is for the purpose of rendering the solution sufficiently active to obtain the utmost bonding action. Inasmuch as the solvent properties of the solution are controlled by its temperature, it is possible to retard its action to any required degree, thereby avoiding all likelihood of marring of the celluloid or the formation of bubbles. In order to obtain the best results, the ingredients of the solvent composition should be in the highest possible state of purity, so as to avoid the production of a dirty finished product which will require cleaning, and to insure against any tendency of the bond to weaken and let go after a long exposure to the elements. By the use of pure ingredients, the leaving of gummy substances in the machine and the consequent necessity of frequent cleaning are also avoided.

Out of an abundance of caution, to prevent any possibility of separation of laminæ, it is advisable after the welding operation has been completed, to immerse the article in a bath of linseed oil and a gum, such as kauri, which is maintained at an elevated temperature. This solution acts upon the exposed edge of the celluloid to form a coating which protects the article against disintegration by atmospheric action.

Having thus explained the nature of the invention and described an operative manner of practicing the same, although without attempting to set forth all of the forms in which it may be practiced, what is claimed is:—

1. A method of producing non-shatterable glass comprising applying solvent to laminæ of glass and celluloid, said solvent being inactive at the time it is applied and subsequently rendering said solvent active.

2. A method of producing non-shatterable glass comprising applying solvent to laminæ of glass and celluloid, said solvent being inactive at the time it is applied and subsequently rendering said solvent active, and finally pressing the laminæ together.

3. A method of producing non-shatterable glass comprising applying a solvent to laminæ of glass and celluloid, the temperature of said solvent at the time of its application being such that the solvent is inactive, and raising the temperature to render the solvent active.

4. A method of producing non-shatterable glass comprising applying a solvent to laminæ of glass and celluloid, the temperature of said solvent at the time of its application being such that the solvent is inactive, raising the temperature to render the solvent active, and then pressing the laminæ together.

5. A method of producing non-shatterable glass comprising applying a solvent to laminæ of glass and celluloid, the temperature of said solvent at the time of its application being such that the solvent is inactive, raising the temperature to render the solvent active, and finally pressing the laminæ together while being subjected to an increasing temperature.

6. A method of producing non-shatterable glass comprising immersing glass and celluloid laminæ in a celluloid solvent which is inactive at the time at which it is applied, and subsequently rendering said solvent active.

7. A method of producing non-shatterable glass comprising, maintaining a celluloid solvent at a normally inactive temperature, immersing celluloid and glass laminæ in said solvent, and then raising the temperature to render the solvent active.

8. A method of producing non-shatterable glass comprising immersing glass and celluloid laminæ in a celluloid solvent which is inactive at the time at which it is applied, subsequently rendering said solvent active, and applying pressure to the laminæ while the solvent is active.

9. A method of producing non-shatterable glass comprising maintaining a celluloid solvent at a normally inactive temperature, immersing celluloid and glass laminæ in said solvent, raising the temperature to render the solvent active, and finally pressing the laminæ together while the solvent is active.

10. A method of producing non-shatterable glass comprising immersing glass and celluloid laminæ in a celluloid solvent which is inactive at the time at which it is applied, subsequently rendering said solvent active, applying pressure to the laminæ while the solvent is active, and subjecting the parts to an increasing temperature during pressure.

11. A method of producing non-shatterable glass comprising immersing glass and celluloid laminæ in a solution consisting of one or more of the higher alcohols, one of the essential oils and camphor, and subsequently heating.

12. A method of producing non-shatterable glass comprising immersing assembled glass and celluloid laminæ in a solution consisting of one or more of the higher alcohols, one of the essential oils, and camphor, subsequently heating, and finally applying pressure to the laminæ.

13. A method of producing non-shatterable glass comprising immersing glass and celluloid laminæ in a solution consisting of fusel oil, camphor and methyl salicylate, and subsequently heating.

14. A method of producing non-shatterable glass comprising immersing assembled glass and celluloid laminæ in a solution consisting of fusel oil, camphor, and methyl salicylate, subsequently heating, and finally applying pressure to the laminæ.

15. A method of producing non-shatterable glass comprising immersing glass, and celluloid laminæ in a solution of fusel oil, camphor and methyl salicylate while the solution is at a temperature between 24 degrees and 25 degrees centigrade, and subsequently raising the temperature of the solution which has been applied to the laminæ.

16. A method of producing non-shatterable glass comprising immersing assembled glass and celluloid laminæ in a solution consisting of fusel oil, camphor and methyl salicylate while the solution is at a temperature between 24 degrees and 35 degrees centigrade, subsequently raising the temperature of the solution which has been applied to the laminæ, applying pressure to the laminæ, and subjecting the parts to a progressively increasing temperature during the pressure.

17. A method of producing non-shatterable glass comprising immersing assembled glass and celluloid laminæ in a solution consisting of one or more of the higher alcohols, an essential oil, camphor and a coal tar preparation, and subsequently heating.

18. A method of producing non-shatterable glass comprising immersing assembled glass and celluloid laminæ in a solution consisting of fusel oil, camphor, methyl salicylate and a coal tar preparation, and subsequently heating.

19. A method of producing non-shatterable glass comprising immersing assembled glass and celluloid laminæ in a solution consisting of one or more of the higher alcohols, one of the essential oils, and camphor, subsequently heating, and an ingredient capable of producing color effects, and subsequently heating.

20. A method of producing non-shatterable glass comprising immersing assembled glass and celluloid laminæ in a solution consisting of fusel oil, camphor, methyl salicylate and an amine, and subsequently heating.

21. A method of producing non-shatterable glass comprising applying a normally inactive solvent to laminæ of glass and celluloid and subsequently rendering said solvent active to cause an adhesion of the laminæ, and finally subjecting the finished article to the action of a solution which will produce a protecting coating on the edge thereof.

22. An article of manufacture comprising laminæ of glass and celluloid and an interposed retarded solvent of a nature incapable of destroying the transparency of the celluloid under normal atmospheric conditions.

In testimony whereof I have hereunto set my hand.

OTTO S. MARCKWORTH.